United States Patent [19]

Hoenel et al.

[11] Patent Number: 5,565,508
[45] Date of Patent: Oct. 15, 1996

[54] AQUEOUS SYNTHETIC RESIN DISPERSION OF AN IONIC RESIN, A BLOCKED ISOCYANATE AND AN ETHYLENICALLY UNSATURATED MONOMER

[75] Inventors: Michael Hoenel; Achim Voelker; Gerd Walz, all of Wiesbaden; Peter Ziegler, Mainz, all of Germany

[73] Assignee: Hoechst Aktiengesellschaft, Germany

[21] Appl. No.: 234,543

[22] Filed: Apr. 23, 1994

[30] Foreign Application Priority Data

Apr. 30, 1993 [DE] Germany .................. 43 14 297.4

[51] Int. Cl.$^6$ .................. C08F 8/00; C08L 63/00
[52] U.S. Cl. .................. 523/414; 523/137; 523/402; 523/406; 523/415; 523/417; 525/107; 525/111; 525/113; 525/123; 525/124; 525/452; 525/528; 525/529
[58] Field of Search .................. 523/402, 403, 523/406, 414, 415, 417, 137; 525/107, 123, 523, 528, 529, 530, 531, 532, 111, 113, 124, 452

[56] References Cited

U.S. PATENT DOCUMENTS

| | | | |
|---|---|---|---|
| 4,297,261 | 10/1981 | Jozwiak, Jr. .................. | 523/413 |
| 4,755,418 | 7/1988 | DebRoy et al. .................. | 428/215 |
| 4,865,704 | 9/1989 | Saatweber et al. .................. | 525/529 |
| 4,916,019 | 4/1990 | Nakatani et al. .................. | 525/124 |
| 5,096,556 | 3/1992 | Corrigan et al. .................. | 523/403 |
| 5,114,552 | 5/1992 | McCollum et al. .................. | 523/410 |
| 5,185,065 | 2/1993 | Chung et al. .................. | 525/124 |
| 5,212,216 | 5/1993 | Hattori et al. .................. | 525/108 |
| 5,260,354 | 11/1993 | Kaylo et al. .................. | 523/412 |

FOREIGN PATENT DOCUMENTS

| | | |
|---|---|---|
| 0415593 | 3/1991 | European Pat. Off. . |
| 0415594 | 3/1991 | European Pat. Off. . |
| 0470674 | 2/1992 | European Pat. Off. . |
| 0261385 | 3/1988 | Germany . |

*Primary Examiner*—Melvyn I. Marquis
*Assistant Examiner*—Randy Gulakowski
*Attorney, Agent, or Firm*—Bierman & Muserlian

[57] ABSTRACT

Aqueous synthetic resin dispersions comprising A) an ionic resin, preferably a cationic resin, B) a blocked polyisocyanate and C) a polymer of at least one ethylenically unsaturated monomer which can be polymerized by free-radical polymerization. These synthetic resin dispersions are used as binders in electrodeposition coating baths.

14 Claims, No Drawings

AQUEOUS SYNTHETIC RESIN DISPERSION OF AN IONIC RESIN, A BLOCKED ISOCYANATE AND AN ETHYLENICALLY UNSATURATED MONOMER

In coating by electrodeposition the electrodeposition coating materials preferably employed are those contain, as binder, cationic, amine-modified epoxy as the water-soluble basic resin component and poly isocyanates blocked with alcohols and/or amines as the crosslinking agent.

In order to prepare the individual binder components, solvents must be employed for reasons of viscosity or reactivity. For instance, in the synthesis of the basic resins protic (alcohols, glycols) and aprotic solvents such as ketones, esters or aromatics are used, and aprotic solvents are used in the synthesis of the crosslinking component.

However, as is known, as the solvent content of cathodic deposition coating (CDC) baths increases, the throwing power (coating of cavities) is less, instances of excessive coating occur, and an increased quantity of solvent passes into the effluent and/or the waste air. For this reason the solvents have to be stripped off from the binders before and/or after dispersion in water, for example by distillation or ultrafiltration. These methods result in a portion of the solvent remaining in the dispersions and, especially when

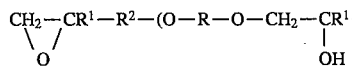 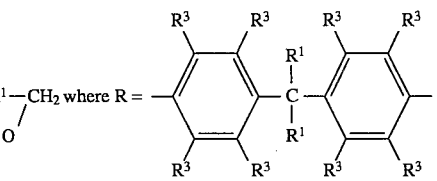

"stripping" from the aqueous phase and during ultrafiltration, relatively large quantities are obtained of a solvent-water mixture which has to be disposed of.

The object was therefore to develop a simplified and ecologically acceptable process for the preparation of aqueous CDC binder dispersions which are substantially free from organic solvents.

This object is surprisingly achieved by preparing the binder components in the presence of unsaturated monomers which are subsequently converted, by emulsion or suspension polymerization, into water-insoluble polymers. In this way aqueous dispersions are obtained.

The invention relates to aqueous synthetic resin dispersions comprising A) an ionic resin, B) a blocked polyisocyanate and C) a polymer of at least one ethylenically unsaturated monomer which can be polymerized by free-radical polymerization.

Suitable ionic resins A) are both anionic and cationic resins, with cationic resins being preferred because of their better throwing power and corrosion protection. The cationic resins preferably contain groups having an active hydrogen atom such as hydroxyl, primary or secondary amino or thiol groups. These groups serve as reactive centers when the coating material is cured with crosslinking agents such as, for example, blocked polyisocyanates.

Component A) is preferably an amino-epoxy resin which is water-dilutable by neutralization with organic acids, and/ or carbonate/amine adducts as described in DE-A 36 44 370 and EP-A 272 665. Such amino-epoxy resins generally have an amine number of from 30 to 150 (mg of KOH per g of solid resin), a hydroxyl number of from 50 to 500 (mg of KOH per g of solid resin) and an average molecular mass (Mn) of from 250 to 10,000 g/mol, preferably from 300 to 5000 g/mol. The lower limit for the amine number should preferably be 45, particularly preferably 70, while the upper limit should preferably be about 120, particularly preferably about 100. If the amine number is too low, then the solubility is insufficient, or an excessive degree of neutralization leads to exces-sive pH values in the deposition baths. If the amine number is too high, then deposition results in a poorly adhering film or a blistered surface.

Examples of amino-epoxy resins are reaction products of epoxide group-containing resins with preferably terminal epoxide groups from the classes of polyglycidyl ethers, polyglycidyl esters and polyglycidyl amines with saturated and/or unsaturated secondary and/or primary amines or amino alcohols respectively. These may be modified by at least one primary and/or secondary hydroxyl group, by the dialkylamino group and/or by a primary amino group which is temporarily protected by ketimine formation.

Amino-epoxy resins containing hydroxyl groups are conveniently obtained from polyglycidyl ethers having preferably two 1,2-epoxide groups per molecule. Polyglycidyl ethers in the context of this invention are understood to be preferably those polyglycidyl ethers of the formula where $R^1 =$ —H and/or —$C_mH_{2m}+1$ $R^2 =$ —$(CR^1)_m$—, preferably —$CH_2$—

$R^3 =$ —$R^1$, halogen or preferably —H n=from 0 to 8, preferably 1 to 6 m=from 1 to 8, preferably 1.

These polyglycidyl ethers have an average molecular mass (Mn) of from approximately 300 to 5000 g/mol and an epoxide equivalent mass of from approximately 170 to 2500 g/mol.

Examples thereof are reaction products of epichlorohydrin or methylepichlorohydrin with dihydroxydiphenylpropane (bisphenol F) or dihydroxydiphenylpropane (bisphenol A), and with dihydroxybenzophenone or dihydroxynaphthalene. Polyepoxides with a suitable molecular mass are prepared either by selecting the molar ratios of bisphenol and epichlorohydrin or by reacting the monomer diglycidyl compounds with further bisphenol, with the addition of catalysts such as Lewis acids or phosphonium salts.

The epoxy resins may be completely or partially hydrogenated, or may be employed in mixtures of different structure and molecular mass. Furthermore, elastication can be achieved by replacing a portion of the polyglycidyl ether described by aliphatic polyglycidyl ethers of the formula

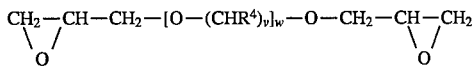

where $R^4$ is H or a lower alkyl radical which is optionally provided with various substituents, v is a number from 2 to 6 and w is a number from 5 to 50.

Examples are bisglycidyl ethers of bisphenol A- and bisphenol F-polypropylene glycol and polyethylene glycol ethers having varying degrees of polymerization. The modified epoxy resins can also be modified by reaction with long-chain polyols such as 1,6-hexanediol, neopentylglycol, bis-ethoxylated neopentylglycol, neopentylglycol hydroxypivalate and bis(hydroxymethyl)cyclohexane, monoanhydropentaerythritol and polytetrahydrofurandiol, polycaprolactonediol, polycaprolactamdiol or polybutadienediol in the presence of suitable basic or acidic catalysts such as boron fluoride-amine complexes. Whereas polyalcohols having primary OH groups can be reacted directly with polyglycidyl ethers, given suitable catalysis, secondary OH groups are reacted initially with diisocyanate. The resulting NCO-terminal reaction products can then easily be incorporated as a bridge between 2 mol of polyglycidyl ether, increasing the molecular mass and the functionality. A detailed listing of suitable epoxide compounds can be found in the handbooks "Epoxidverbindungen und Harze [Epoxide Compounds and Resins]" by A. M. Paquin, Springer Verlag Berlin 1958, chapter IV and "Handbook of Epoxy Resins" by H. Lee, K. Neville, McGraw-Hill Book Company, New York 1982, reissue, and "Epoxy resin chemistry and technology" by C. A. May, Marcel Dekker Inc., New York and Basel 1988.

In order to reduce the amine number, the epoxy resin can also be modified with saturated or unsaturated polycarboxylic acids and/or hydroxyalkylcarboxylic acids. Examples of aliphatic, cycloaliphatic and/or aromatic polycarboxylic acids of various chain lengths are adipic acid, sebacic acid, fumaric acid, isophthalic acid and dimeric fatty acid. The term hydroxyalkylcarboxylic acids is understood to refer to lactic acid, dimethylolpropionic acid, or, alternatively, polyesters containing carboxyl and hydroxyl groups. The reaction of excess polyglycidyl ether of low molecular weight with polycarboxylic acids and/or polyalcohols produces modified polyglycidyl ethers as the intermediate stage, which are then reacted further with amines and/or amino alcohols.

It is also possible to use heterocyclic polyepoxide compounds such as 1,3-diglycidyl-5,5-dimethylhydantoin, triglycidyl isocyanurate or diepoxides of bisimides. Another suitable class of polyepoxides is polyglycidyl ethers of phenolic novolak resins, whereby the functionality can be increased from 2 up to about 6 glycidyl groups per molecule. In addition, by defunctionalization with long-chain alkylphenols such as dodecylphenol, it is also possible to incorporate elasticating elements. Other possibilities for use are polyglycidyl esters of polycarboxylic acids, such as diglycidyl hexahydrophthalate, diglycidyl tetrahydrophthalate or diglycidyl fumarate.

The introduction of the amino groups is carried out either by addition of NH-reactive compounds to the epoxide group or by reacting the hydroxyl groups of the basic resin with basic monoisocyanates which are formed by reacting aromatic and/or aliphatic and/or cyclo-aliphatic di- or polyisocyanates with dialkylaminoalkanol (cf. DE-A-27 07 405).

NH-reactive compounds used are primary amines such as methylamine, ethylamine, propylamine, butylamine, octylamine, monoethanolamine, 2-ethylhexylamine, dimethylaminopropylamine, diethylaminoethylamine, dimethylaminoneopentylamine or methoxypropylamine and/or, preferably, secondary amines such as dialkylamines, monoalkylhydroxyalkylamines or dihydroxyalkylamines. Examples of such compounds are dimethylamine, diethylamine, dipropylamine, dibutylamine, methylbutylamine, dimethylaminopropylamine, N-methylaminoethanol or diethanolamine, or else cyclic amines such as morpholine or oxazolidine. When using the primary amines, the amine reacts with 1 or 2 epoxide groups depending on the stoichiometric ratios available, with enlargement of the molecule.

It is also possible to employ primary amines of the formula $$H_2H—CR_1R_2—R_3—O(CHR_4—CHR_5O)_nR_6$$

or secondary amines of the formula $$R_7NH—CR_1R_2—R_3—O(CHR_4—CHR_5O)_n—R_3—CR_1R_2—NHR_7$$

In this formula, $R_1$ and $R_2$ are hydrogen, or alkyl or —$CH_2$—OH groups, $R_3$ is a linear or branched alkylene radical, especially an alkylene radical having 1 to 3 carbon atoms, $R_4$ and $R_5$ are hydrogen or alkyl radicals having 1 to 4 carbon atoms, $R_6$ is hydrogen or an alkyl, cycloalkyl or phenyl radical, preferably an alkyl radical having 1 to 6 carbon atoms, and n=0.5, and $R_7$ is a linear or branched alkyl radical having 1 to 6 carbon atoms. Examples of such monoamines are: ethanolamine, propanolamine, butanolamine, ethylene glycol mono(2aminoethyl) ether ($H_2N$—$CH_2$—$CH_2$—O—$CH_2$—$CH_2$—OH) and diethylene glycol mono(3-aminopropyl) ether ($H_2N$—$(CH_2)_3$—O—$CH_2$—$CH_2$—O—$CH_2$—$CH_2$—OH). When primary amines are used, the amine reacts with the epoxide group depending on the stoichiometric ratios available, with enlargement of the molecule. Examples of diamines are: the Jeffamine® M series, the Jeffamine® D series and the Jeffamine® ED series.

Also suitable are di- or triamines having primary and/or secondary amino groups, such as laurylpropylaminediamine and tallowfatty-propylenediamine.

With secondary diamines, chain extension occurs. The secondary diamines used, preferably long-chain diamines, are N,N'-dialkyldiaminoalkanes, for example, N,N'-bis-(isohexyl)-1,6-diaminohexane, N,N'-bis(isohexyl)isophoronediamine, N,N'-bis(isohexyl)dimethylhexamethylenediamine, N,N'-bis(isohexyl)-2-methylpentamethylenediamine, N,N'-bis(isohexyl)ethylenediamine and N,N'-bis-(isohexyl)-di(4-aminocyclohexyl)methane or reaction products of saturated glycidyl ethers or glycidyl esters or epoxyalkanes with primary diamino alkanes, such as the addition product of 1,6-hexanediamine with 2 mol of the glycidyl ester of Versatic acid (α-branched monocarboxylic acids, especially $C_9$–$C_{11}$).

Monoepoxides which can be employed for this purpose include saturated or unsaturated glycidyl ethers or α-epoxides of various chain length, such as dodecane-1,2-epoxide or butylene oxide. The suitable number of hydroxyl groups arises on the one hand automatically from the epoxide group during addition of the secondary amino groups, while on the other hand it can be controlled by using hydroxyalkylamines. In addition, secondary diamines which can be employed are the reaction product of 2 mol of 2-ethylhexylamine with 1 mol of Beckopoxe® EP 075 (diglycidyl ether based on propylene oxide) and/or 1 mol of Beckopox® EP 140, and also aliphatic secondary diamines based on propylene-oxide adducts of diols or triols, for example Novamin® grades.

The molar ratios between compounds containing epoxide and amino groups should be selected such that the complete incorporation of the amine is ensured, since otherwise rupture-like surface defects may occur during electrophoretic coating, i.e. a slight excess of epoxide groups is advantageous.

All the amines can be reacted simultaneously with the epoxide groups, or a stepwise procedure can be followed. The reaction of the amines commences even at room temperature and is generally exothermic. In order to achieve complete reaction, it is generally necessary to increase the temperature temporarily to from about 50° to 120° C. The amino-epoxy resin is prepared in each case in the presence of one or more ethylenically unsaturated monomers which can be polymerized by free-radical polymerization. An advantageous procedure is one in which the epoxy resin is first dissolved in one or more ethylenically unsaturated monomers which can be polymerized by free-radical polymerization, and then reacted with the amines.

For crosslinking reactions, hydroxyl groups must always be present in the amino-epoxy resin. The hydroxyl number in the molecule (expressed in mg of KOH per gram of solid resin) is critical for the crosslinkability of the film. It should be over 50, preferably over 100 and particularly advantageously over 150. The upper limit of the hydroxyl number is 400, more advantageously below 300. If the hydroxyl number is too low, then crosslinking gives rise to films which are still soluble in organic solvents such as methyl ethyl ketone. If, on the other hand, the hydroxyl number is too high, then the film becomes too brittle and may possibly also be too hydrophilic. The molecule must contain at least two crosslinkable, preferably primary hydroxyl groups.

The primary and/or secondary hydroxyl groups which are important for the crosslinking process may in part be replaced by primary and/or secondary amino groups. The introduction of primary amino groups into the basic resin structure is preferably carried out by reacting resins containing at least one, preferably at least two, epoxide groups per molecule with an amino and/or hydroxyl group-containing ketimines and/or aldimine and/or polyamine. The ketimines are prepared in accordance with known methods, by eliminating water from the corresponding polyamines of structure R—NR—R—NH$_2$ or the corresponding amino alcohols of structure HO—R—NH$_2$ and the appropriate aliphatic ketones such as diethyl ketone, methyl isobutyl ketone or ethyl n-propyl ketone or else cyclopentanone, cyclohexanone, acetophenone etc. Preferred ketimines are reaction products of methyl isobutyl ketone and diethylenetriamine. The reaction conditions (reaction temperature, choice of solvent) must be chosen such that no substances which decompose the ketimine bond, such as water, remain present in the reaction product.

The ketimine protects the primary amino group (cf. U.S. Pat. No. 3,523,925) so that the amine can be reacted without difficulties with the basic epoxy resin via a further functional group, for example a hydroxyl group or preferably a secondary amino group. The choice of the molar ratios of the components employed must ensure that no unreacted low molecular weight amine remains in the batch, since otherwise rupture-like surface defects occur during electrophoretic coating. The reaction of the secondary amino groups of the polyaminoketimine with the epoxide groups commences even at room temperature and is generally exothermic. In order to achieve complete reaction, it is generally necessary to increase the temperature temporarily to from 50° to 120° C.

The blocked polyisocyanates (component B) are prepared by reacting a polyfunctional isocyanate with an at least stoichiometric quantity of a monofunctional compound which contains active hydrogen (Zerewitinoff reaction), with the possible addition, if desired, of basic catalysts such as tertiary amines or small amounts of tin salts such as dibutyltin dilaurate. In this way the isocyanate group is protected at room temperature against reaction with water or alcohols. The protective group is eliminated again at baking temperatures of less than 210° C., preferably less than 190° C. and particularly under 180° C. but on the other hand above 110° C., preferably over 150° C., so that a crosslinking reaction can take place with the hydroxyl groups of the basic resin. Agents which block the isocyanates contain only one amine, amide, lactam, thiol or hydroxyl group. Compounds which have proven suitable are, for example, aliphatic or cycloaliphatic alcohols such as methanol, ethanol, propanol, butanol, pentanol, hexanol, 2-ethylhexanol, or 2-pyridylmethanol, or dialkylamino alcohols such as dimethylaminoethanol, oximes such as methyl ethyl ketoxime, lactams such as ε-caprolactam or 2-pyrrolidone, imides such as phthalimide or N-hydroxymaleimide, hydroxyalkyl esters, malonic esters or acetoacetic esters. However, β-hydroxy glycols or β-hydroxy glycol ethers and glycolamides are also recommended.

Typical and suitable polyfunctional isocyanates are aliphatic, cycloaliphatic and/or aromatic polyisocyanates having at least two isocyanate groups per molecule. Suitable aromatic diisocyanates are the isomers or isomer mixtures of phenylene diisocyanate, tolylene diisocyanate, xylylene diisocyanate, biphenylene diisocyanate, naphthylene diisocyanate and diphenylmethane diisocyanate, biphenylene tetraisocyanate, preferably naphthyl tetraisocyanate, tolylene diisocyanate, isophorone diisocyanate and xylylene diisocyanate. Because of their good resistance to ultraviolet light, (cyclo)aliphatic diisocyanates give products with little tendency to yellowing. Examples of such compounds are isophorone diisocyanates, cyclopentylene diisocyanates and the hydrogenation products of aromatic diisocyanates, such as cyclohexylene diisocyanate, methylcyclohexylene diisocyanate and dicyclohexylmethane diisocyanate, and aliphatic diisocyanates of the formula

$$O=C=N-(CR_2)_r-N=C=O$$

in which r is an integer from 2 to 20, in particular from 6 to 8, and R is hydrogen or a lower alkyl radical having 1 to 8 carbon atoms, preferably 1 or 2 carbon atoms.

Examples thereof are trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate, trimethylhexane diisocyanate. Particularly preferred diisocyanates are isophorone diisocyanate, dicyclohexylmethane diisocyanate, diphenylmethane diisocyanate, trimethylene diisocyanate, tetramethylene diisocyanate or tolylene diisocyanate.

Vinyl polymers which contain isocyanate groups and are prepared by copolymerization of, for example, cyantoethyl (meth)acrylate or dimethyl-isopropylbenzyl isocyanate with alkyl (meth)acrylates and/or (alkyl)-vinylbenzenes can also be used. Also suitable are mixed aliphatic/ aromatic isocyanate compounds. Polyisocyanates which have proven suitable are products which are prepared by trimerization or oligomerization of the above mentioned diisocyanates or by reaction of these diisocyanates with polyfunctional compounds containing OH or NH groups. If necessary, the average functionality can optionally be reduced by adding monoisocyanates. Examples of such chain-terminating monoisocyanates are phenyl isocyanate, cyclohexyl isocyanate and stearyl isocyanate.

An enlargement of the molecule can also be brought about by reaction with polyalcohols which contain tertiary amino groups, such as N-methyldiethanolamine or triethanolamine, or polyamines containing tertiary amino groups, such as 3-methyl-3-(2-aminoethyl)aminopropylene. In order to improve the solubility, it is also possible to employ chain-terminating N-dialkylamino alcohols such as dimethylaminoethanol, or N,N-dialkylalkylenediamines such as dimethylaminopropylene or N,N-diethyl-N'-methyl1,2-ethanediamine. Isocyanate-containing prepolymers based on polyglycol ethers, polyester polyols, polyether polyols, polycaprolactone polyols and/or polycaprolactam polyols can likewise be employed with advantage.

For the synthesis of the blocked polyisocyanates, the corresponding mono- or diisocyanate can be dissolved, prior to adding the blocking agent, in the ethylenically unsaturated compounds C) or mixtures thereof which are required for the preparation of the polymer C). As an alternative to this, the unsaturated monomer can also be added to the isocyanate after the addition of the blocking agent.

Another variant comprises only semi-blocking the described diisocyanates, in a stoichiometrically appropriate manner, with the described monoalcohols and/or amines, in which case reaction products of butylglycol or butylglycol with tolylene diisocyanate and methyl ethyl ketoxime with isophorone diisocyanate and tetramethylxylylene diisocyanate are preferred. The semi-blocking can be carried out in bulk, without solvent, or in the monomers described. Such semi-blocked diisocyanates are then subjected to an addition reaction via the remaining NCO function, either before or preferably after the reaction of the epoxy resins with the amines, with the free hydroxyl and/or amino groups of the epoxy resin or the amino-epoxy resin, this addition reaction preferably being carried out in the presence of the monomers described. In this manner, so-called autocrosslinking systems are obtained which are likewise a subject of this invention. In order to achieve a balance in terms of application properties, an autocrosslinking system may be admixed in part with a blocked polyisocyanate B).

Suitable unsaturated monomers, which are already present during the synthesis of the amino-epoxy resin or else during the synthesis of the blocked isocyanate or are added after the synthesis thereof, are preferably acrylic or methacrylic esters of monoalcohols containing from 1 to 18 carbon atoms, preferably n-butyl methacrylate, methyl methacrylate, isobutyl acrylate and 2-ethylhexyl acrylate, especially butyl acrylate. Further suitable monomers are styrene, vinyltoluene or α-methylstyrene, or more highly substituted styrenes such as 2,4-dimethylstyrene, and also vinyl esters of monocarboxylic acids containing from 2 to 15 carbon atoms, for example vinyl acetate, vinyl propionate, vinyl pivalate or vinyl Versatate. Particularly preferred in this context are styrene, vinyltoluene and α-methylstyrene. Further suitable unsaturated monomers are hydroxyalkyl acrylates, preferably hydroxyethyl (meth)acrylate or hydroxypropyl (meth)acrylate, or monomers containing unsaturated 1,2-epoxide groups, such as glycidyl (meth)acrylate. Monomers of this kind, because of their reactive groups, cannot be added until after the synthesis of the amino-epoxy resin or of the blocked isocyanate. In the case of the unsaturated monomers, too, which contain no such reactive groups, a part thereof may not be added until after the synthesis of the amino-epoxy resin. The quantity of unsaturated monomers or of polymer C) is from about 1 to 80% by weight, preferably from 5 to 30% by weight, based on the total quantity of components A), B) and C), in each case calculated as solids.

The mixing ratio of components A) to B) is preferably between 90:10 and 60:40% by weight and is empirically determined from the optimum achievable applications properties at the given baking temperature. Components A) and B), preferably in the form of their mixtures with the unsaturated monomers, can either be mixed cold in the ratio described or else component B) is added at elevated temperature to component A) which is produced in situ. Subsequently, additives and acids which are customary in paint processing are added.

The crosslinking of OH group-containing component A) with blocked polyisocyanates B) can, if desired, be accelerated by adding from 0.01 to 2% by weight, specifically 0.5 to 1% by weight, based on the sum of components A) and B), of strongly basic tertiary amines and/or active metal compounds. A particular and sometimes synergistic effect is achieved if the OH group-containing resin deposited is present in a strongly basic medium and the metal salts taken are of bismuth, lead, cobalt, iron, antimony and/or tin (II) and tin (IV). It is particularly preferred to employ catalysts such as iron(III) acetylacetonate, dibutyltin dilaurate, tri-n-butyltin oxide, dibutyltin dioctylmaleate, tin octanoate, tin oleate, tetrabutyl titanate, cobalt 2-ethylhexanoate and reaction products of bismuth trioxide with hydroxycarboxylic acids such as lactic acid or dimethylolpropionic acid.

In order to balance the applications properties, it is advantageous for the cathodically depositable resin also to contain, in addition to the crosslinking agent, up to 15% by weight, preferably from 1 to 10% by weight, of hydroxy- and/or amino- and/or epoxy-functional monomers containing double bonds, which monomers are able to react with the blocked polyisocyanates and the amino-epoxy resin.

By protonation with acids the cationic binder mixture is rendered dilutable with water in a manner known per se. Examples of acids are formic acid, lactic acid, acetic acid, propionic acid, citric acid, malonic acid, acrylic acid, dimethylolpropionic acid, oxalic acid, phosphoric acid and alkylphosphoric acids. Monobasic, low molecular weight organic carboxylic acids are preferred. The amount of acid added must be at least sufficient to ensure a stable emulsion of the cationic base resin. An excess of acid, i.e. a degree of neutralization of over 100%, should expediently be avoided. The MEQ value (milli-equivalents of acid per 100 g of solid resin) is in general between 20 and 80. The aim is for as low as possible a MEQ value, in order to obtain as high as possible a deposition equivalent. This mixture is then processed further to give an emulsion with demineralized water at a preferred temperature of 60°–95° C.

In the resulting emulsion, free-radical initiators are added in order subsequently to polymerize the unsaturated monomers present in accordance with known emulsion polymerization techniques, to give 30 to 60%, preferably 30 to 40% dispersions. The free-radical initiators used can be both all known redox systems as well as thermally decomposing free-radical initiators such as azo compounds, peroxides, peracid esters and hydroperoxides. Preference is given to tert-butyl hydroperoxide/ascorbic acid. The molecular weights of the resulting polymer resins C), determined by the gel permeation chromatography method, are between 10,000 and 2,000,000 g/mol, preferably 30,000 and 600,000 g/mol. For fine adjustment of appropriate molecular weights it is possible if desired, to employ regulators such as alcohols, polyethers, thiols or hypophosphorous acid. The polymerization temperatures are in general between about 20 and 95° C. They depend on the desired molecular mass range, on the polymerization initiators used and on the activity optimum of the latter.

The dispersions according to the invention are outstandingly suitable as ionically stabilized, water-based binders. Further processing to give electrodeposition coating materials is particularly preferred, which involves the aqueous binder dispersion being admixed with pigments, such as titanium dioxide and carbon black, and, if desired, catalysts, both of which are preferably incorporated via an aqueous pigment paste.

The preparation of pigment pastes is generally known and requires no further description here; compare in this respect D. H. Parker, Principles of Surface Coating Technology, Interscience Publishers, New York (1965); R. L. Yates, Electropainting, Robert Draper Ltd., Teddington, England (1966); H. F. Payne, Organic Coating Technology, volume 2, Wiley and Sons, New York (1961).

These electrodeposition coating materials, based on the dispersions according to the invention, may contain lead silicate as anticorrosion pigment. However, a particular advantage lies in the fact that the dispersions according to the invention are suitable for lead-free electrodeposition coating materials.

PREPARATION EXAMPLES 1.1 Preparation of the Crosslinking Agents
Crosslinking Agent B-1

In a reaction vessel fitted with a stirrer, thermometer, dropping funnel and reflux condenser, 80.91 g of butylglycol are metered at room temperature, at a rate such that the internal temperature does not exceed 50° C., into a solution of 119.31 g of tolylene diisocyanate (TDI), 0.05 g of DBTL (dibutyltin laurate), 57.74 g of butyl methacrylate and 0.59 g of ionol. As soon as an NCO value of 12.48% (calculated with respect to solid resin) has been reached, 30.63 g of trimethylolpropane are added in 3 portions. The temperature is subsequently maintained at below 90° C. until an NCO value of <0.2% has been reached, and 20.00 g of 2-ethyl-hexanol are added. Solids content: 74.82% by weight Crosslinking Agent B-2

As Crosslinking agent B-1, only with butyl acrylate as solvent.
Solids content: 74.82% by weight
Crosslinking Agent B-3

As Crosslinking agent B-1, only with styrene as solvent.
Solids content: 74.82% by weight.

Crosslinking agent B-4

As Crosslinking agent B-1, only with α-methylstyrene as solvent.
Solids content: 73.52% by weight
Crosslinking Agent B-5

In a reaction vessel fitted with a stirrer, thermometer, dropping funnel and reflux condenser, 35.40 g of butylglycol are metered at room temperature, at a rate such that the internal temperature does not exceed 50° C., into a solution of 52.2 g of tolylene diisocyanate (TDI) and 29.32 g of toluene. As soon as an NCO value of 12.48% (calculated with respect to solid resin) has been reached, 13.43 g of trimethylolpropane are added in 3 portions. The temperature is subsequently maintained at below 90° C. until an NC0 value of <0.2% has been reached, and 18.01 g of methoxypropanol and 7.05 g of 2-ethyl-hexanol are added. Solids content: 65% by weight 1.2. Preparation of the Amino-Epoxy Resin
Amino-Epoxy Resin A-1

In a reaction vessel fitted with a stirrer, thermometer, dropping funnel and reflux condenser, 31.78 g of diethanolamine are metered at 40° C. into a solution of 428.62 g of a polyglycidyl ether based on bisphenol A having an epoxide equivalent weight of 472, 142.27 g of styrene and 0.40 g of ionol. 15.44 g of dimethylaminopropylamine and 93.23 g of an adduct of 116 g of 1,6-diaminohexane with 500 g of Cardura® E10, the glycidyl ester of an α-branched $C_9$–$C_{11}$ monocarboxylic acid, are then added at 40°–50° C. and the solution is slowly heated to 90°–100° C. To complete the reaction, the temperature indicated is maintained for a further 3 hours. After this time the epoxide content is zero.
Amine number: 98 (rag of KOH/g of solid resin)
Solids content: 74.74% by weight
Amino-Epoxy resin A-2 (comparison)

In a reaction vessel fitted with a stirrer, thermometer, dropping funnel and reflux condenser, 42.00 g of diethanolamine are metered at 40° C. into a solution of 566.4 g of a polyglycidyl ether based on bisphenol A having an epoxide equivalent weight of 472 in 322.0 g of methoxypropanol. 20.4 g of dimethylaminopropylamine and 123.2 g of an adduct of 116 g of 1,6-diaminohexane with 500 g of Cardura® E10, the glycidyl ester of an α-branched $C_9$–$C_{11}$ monocarboxylic acid, are then added at 40°–50° C. and the solution is slowly heated to 90°–100° C. To complete the reaction, the temperature indicated is maintained for a further 3 hours. After this time the epoxide content is zero.
Amine number: 98 (mg of KOH/g of solid resin)
Solids content: 70% by weight.

1.3 Aqueous dispersions D-1–D-4

In a reaction vessel fitted with a stirrer, thermometer, dropping funnel and reflux condenser, 308.64 g of Crosslinking agent B and 16.24 g of 85% strength formic acid are admixed to the solution, heated at 90°–100° C., of 761.40 g of amino-epoxy resin A. Subsequently, the quantity of demineralized water indicated in Table 1 is mixed in, at 90° C. a 1% strength initiator solution of ascorbic acid/tert-butyl hydroperoxide in demineralized water is metered in over 0.5 hours, and polymerization is continued at 90° C. until the solids content is constant (sample weight 1–2 g, conditions: 125 °C., 1 h). In accordance with this general procedure, the dispersions represented in Table 1 are obtained.

TABLE 1

| Dispersion | Epoxyamine | Crosslinking agent | Deionized water | Initiator (1% strength) | Reaction time at 90° C. | Solids content (1 h, 125° C.) | MEQ* | *Residual monomer |
|---|---|---|---|---|---|---|---|---|
| D-1 | A-1 | B-1 | 1726.8 g | 133 g | 2 h | 35% by weight | 30 | <0.3% |
| D-2 | A-1 | B-2 | 1722.2 g | 137 g | " | 35% by weight | " | " |
| D-3 | A-1 | B-3 | 1715.2 g | 144 g | " | 35% by weight | " | " |
| D-4 | A-1 | B-4 | 1443.0 g | 419 g | 3 h | 35% by weight | " | " |

1.4 Aqueous dispersion D-5 (comparison) In a reaction vessel fitted with a stirrer, thermometer, dropping funnel and reflux condenser, a mixture—heated to 80°–85° C.—of 813.27 g of amino-epoxy resin A-2, 40.0 g of Texanol, 16.0 g of 2-ethylhexanol and 355.15 g of Crosslinking agent B-5 are distilled under vacuum. As soon as more than 90% of the solvent has been collected, the mixture is neutralized with 13.0 g of 85% strength formic acid, and dispersed with the continuous addition of 1397.0 g of demineralized water.

| Solids content: | 35% by weight | |
| --- | --- | --- |
| MEQ: | 30 | |
| Residual solvent: | Methoxypropanol | 2.0–2.5% |
| | Toluene | 0.2–0.5% |
| | Total | 2.2–3.0% |

2. Preparation of a Pigment Paste 2.1. Preparation of a Paste Resin 2.1.1.

1708 parts (4 mol) of Denacol EX-145 (phenol-(EO5) glycidyl ether) are run in at 60°–80° C. over the course of one hour into a solution of 204 parts (2 mol) of N,N-dimethylaminopropylamine in 1224 parts of ethoxypropanol, and the mixture is subsequently maintained at 80°–100° C. until an EP number of practically 0 has been reached (amine number approximately 117 mg of KOH/g of solid; about 50% strength). 2464 parts of the adduct prepared in 2.1.2 are added to this solution, and this mixture is maintained at 60°–80° C. until an acid and epoxy number of practically 0 has been reached. The solvent is subsequently removed in vacuo, and 128 parts of butylglycol and 400 parts of lactic acid (90%) are added. Dispersion is carried out by continuous addition of 2245.24 parts of fully deionized water, to give a solids content of 55%.

2.1.2.

1280 parts (2 equivalents of epoxide) of Beckopoxe® SEP 311 (75% strength in xylene) are heated to 80° C. 1184 parts of the urethane of 2.1.3. (75% strength) are run over the course of one hour into this solution, and the mixture is maintained at 80° C. until the % NCO value is practically 0. Subsequently the solvent is removed in vacuo, and the mixture is diluted to approximately 60% with 1232 parts of ethoxypropanol.

2.1.3.

540 parts of iso-octadecyl alcohol and 0.9 parts of DBTL are run at 40°–60° C. over the course of one hour into 348 parts of Desmodure® T 80 (80% 2,4-, 20% 2,6-tolylene diisocyanate) in 296 parts of xylene, and the mixture is subsequently maintained at this temperature until the % NCO value is approximately 9.5 (about 75% strength strength).

2.2. Preparation of the Lead-Free Pigment Paste P-1

A vessel fitted with a stirrer is charged with 13.88 parts of the binder of 2.1.1., 3.13 parts of Texanol, 0.84 parts of acetic acid (50% strength) and 1.97 parts of a 1:1 mixture of 2,4,7,9-tetramethyl-5-decyne-4,7-diol (Surfynol® 104, wetting agent) and Sektol®. 3.66 parts of dibutyltin oxide, 0.31 parts of carbon black, 38.14 parts of titanium dioxide, 0.61 parts of Aerosil and 37.45 parts of fully deionized water are metered into this mixture with stirring. After stirring for one hour, the pigment paste mixture is ground in a bead mill for 1 hour with cooling (SAZ beads: 0.1 mm).

2.3 Preparation of the Lead-Containing Pigment Paste P-2

A vessel fitted with a stirrer is charged with 13.88 parts of the binder of 2.1.1., 3.13 parts of Texanol, 0.84 parts of acetic acid (50% strength) and 1.97 parts of a 1:1 mixture of 2,4,7,9-tetramethyl-5-decyne-4,7-diol (Surfynol 104, wetting agent) and Sektol. 3.66 parts of dibutyltin oxide, 0.31 parts of carbon black, 3.67 parts of lead silicate, 38.14 parts of titanium dioxide, 0.61 parts of Aerosil and 33.78 parts of fully deionized water are metered into this mixture with stirring. After stirring for one hour, the pigment paste mixture is ground in a bead mill for 1 hour with cooling (SAZ beads: 0.1 mm).

3.1 Formulation of the Lead-Free CDC Paints L-1 to L-4

1268.57 parts of the 35% strength binder dispersion (D-1–D-4) are placed in a glass beaker fitted with a stirrer, 1.5 g of formic acid (50%) are added, and the mixture is diluted with 2010.93 parts of fully deionized water. Subsequently, 418.80 parts of the pigment paste P-1 prepared in section 2.2 are added.

3.2 Preparation of the Lead-Containing CDC Paints L-5 to L-8

1268.57 parts of the 35 % strength binder dispersion (D-1–D-4) are placed in a glass beaker fitted with a stirrer, 1.5 g of formic acid (50%) are added, and the mixture is diluted with 2010.93 parts of fully deionized water. Subsequently, 418.80 parts of the pigment paste prepared in section 2.3 (P-2) are added.

3.3 Preparation of a Lead-Free CDC Paint L-9

1268.57 parts of the 35% strength binder dispersion (D-5) are placed in a glass beaker fitted with a stirrer, 1.5 g of formic acid (50%) are added, and the mixture is diluted with 2010.93 parts of fully deionized water. Subsequently, 418.80 parts of the pigment paste (P-1) prepared in section 2.3 are added.

3.4 Preparation of a Lead-Containing CDC Paint L-10

This paint was prepared using the same components as for CDC paint L-9, but using pigment paste (P-2) instead of pigment paste (P-1).

4. Deposition Results

Bright iron panels connected as cathode were coated at 225 V for 2 minutes, at a bath temperature of 32° C., were rinsed with water and were baked at 170° C. for 30 minutes. The baked films had a dry film thickness of 20 μm and no craters.

The applications results of the lead-free formulated CDC paints (L-1–L-4) and of the lead-containing CDC paints (L-5–L-8) are compiled in Tables 2 and 3:

TABLE 2

Lead-free CDC paints:

| Paste | Dispersion | Erichaen indentation (mm) | Impact (inch pound) | Salt spray test (240 h) | Sieving residue (3 weeks) | Paint |
|---|---|---|---|---|---|---|
| P-1 | D-1 | 8.6 | >80 | <1.5 mm | <50 mg/l | L-1 |
| P-1 | D-2 | 8.4 | " | " | " | L-2 |
| P-1 | D-3 | 8.7 | " | " | " | L-3 |
| P-1 | D-4 | 8.3 | " | " | " | L-4 |
| Comparison P-1 | D-5 | 8.9 | " | " | " | L-5 |

TABLE 3

Lead-containing CDC paints:

| Paste | Dispersion | Erichaen indentation (mm) | Impact (inch pound) | Salt spray test (240 h) | Sieving residue (3 weeks) | Paint |
|---|---|---|---|---|---|---|
| P-2 | D-1 | 8.6 | >80 | <1.5 mm | <50 mg/l | L-5 |
| P-2 | D-2 | 8.4 | " | " | " | L-6 |
| P-2 | D-3 | 8.7 | " | " | " | L-7 |
| P-2 | D-4 | 8.3 | " | " | " | L-8 |
| Comparison P-2 | D-5 | 8.9 | " | " | " | L-10 |

We claim:

1. A process for the preparation of an aqueous synthetic resin dispersion comprising A) an ionic resin, B) a blocked polyisocyanate, and C) a polymer of at least one ethylenically unsaturated monomer which can be polymerized by a free-radical polymerization, wherein at least one member of the group consisting of ionic resin A) and the blocked polyisocyanate, B) is prepared in the presence of one or more ethylenically unsaturated monomers as a solvent, and wherein the polymer C) is prepared by polymerization in an aqueous dispersion of one or more ethylenically unsaturated monomers in the presence of the ionic resin A) and the blocked polyisocyanate B).

2. A process as claimed in claim 1, wherein the ionic resin A) is a cationic resin.

3. A process as claimed in claim 1, wherein the ionic resin A) is a cationic amino-epoxy resin.

4. A process as claimed in claim 1, wherein the ionic resin A) is prepared in the presence of one or more ethylenically unsaturated monomers as a solvent.

5. A process as claimed in claim 1, wherein the blocked polyisocyanate B) is prepared in the presence of one or more ethylenically unsaturated monomers as a solvent.

6. A process as claimed in claim 3, wherein the epoxy resin is first dissolved in one or more of the ethylenically unsaturated monomers, and reacted with the amine thereafter.

7. An aqueous synthetic resin dispersion made by the process of claim 1.

8. An electrodeposition coating bath containing as a binder a synthetic resin dispersion of claim 7.

9. A lead-free cationic electrodeposition coating bath containing as a binder a synthetic resin dispersion of claim 7.

10. An aqueous synthetic resin dispersion made by the process of claim 2.

11. An aqueous synthetic resin dispersion made by the process of claim 3.

12. An aqueous synthetic resin dispersion made by the process of claim 4.

13. An aqueous synthetic resin dispersion made by the process of claim 5.

14. An aqueous synthetic resin dispersion made by the process of claim 6.

* * * * *